(12) United States Patent
Takahashi

(10) Patent No.: US 11,073,437 B2
(45) Date of Patent: Jul. 27, 2021

(54) DYNAMOMETER SYSTEM CONTROL DEVICE

(71) Applicant: MEIDENSHA CORPORATION, Tokyo (JP)

(72) Inventor: Toshimichi Takahashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 80 days.

(21) Appl. No.: 16/613,087

(22) PCT Filed: May 9, 2018

(86) PCT No.: PCT/JP2018/017967
§ 371 (c)(1),
(2) Date: Nov. 12, 2019

(87) PCT Pub. No.: WO2018/207832
PCT Pub. Date: Nov. 15, 2018

(65) Prior Publication Data
US 2020/0200627 A1 Jun. 25, 2020

(30) Foreign Application Priority Data

May 9, 2017 (JP) .............................. JP2017-092819

(51) Int. Cl.
*G01L 3/22* (2006.01)
*G01M 13/027* (2019.01)
(Continued)

(52) U.S. Cl.
CPC ............. *G01L 3/22* (2013.01); *G01M 13/027* (2013.01); *G01M 13/028* (2013.01); *G05B 13/042* (2013.01)

(58) Field of Classification Search
CPC ..... G01L 3/22; G01M 13/027; G01M 13/028; G01M 17/0074; G05B 13/042; G05B 13/04
See application file for complete search history.

(56) References Cited

U.S. PATENT DOCUMENTS 4,680,959 A    7/1987  Henry et al.
9,164,005 B2 * 10/2015  Takahashi ............... H02P 23/12
(Continued)

FOREIGN PATENT DOCUMENTS

JP    2006184135 A    7/2006
JP    2009287987 A   12/2009
(Continued)

OTHER PUBLICATIONS

Notice of Decision to Grant a Patent issued to corresponding JP Application No. 2017-092819, dated Jun. 12, 2018; 1 page.

*Primary Examiner* — Freddie Kirkland, III
(74) *Attorney, Agent, or Firm* — Muncy, Geissler, Olds & Lowe, P.C.

(57) ABSTRACT

A control device of a dynamometer system includes a mechanical loss arithmetic unit that generates a loss compensation signal corresponding to loss torque generated in a dynamometer body in a state where a load is connected, on the basis of an angular velocity detection signal, a characteristic vibration suppression control circuit that generates a compensation signal in order to suppress a characteristic vibration of a swinging element, and a torque current command signal generating unit that generates a torque current command signal by subtracting the compensation signal from an upper level torque command signal. The characteristic vibration suppression control circuit is provided with a normative model arithmetic unit, deviation compensator, model input generating unit, and differential compensator that generates a correction signal by subjecting a torque signal obtained by the normative model arithmetic unit to a differential operation.

5 Claims, 5 Drawing Sheets

(51) Int. Cl.
  *G01M 13/028* (2019.01)
  *G05B 13/04* (2006.01)

(56) References Cited

U.S. PATENT DOCUMENTS

| | | | |
|---|---|---|---|
| 9,335,228 B2* | 5/2016 | Takahashi | G01L 3/22 |
| 9,400,508 B2* | 7/2016 | Yamaguchi | G05D 19/02 |
| 10,317,312 B2* | 6/2019 | Pfister | G01M 7/022 |
| 10,371,589 B2* | 8/2019 | Akiyama | G01L 25/006 |
| 2014/0039694 A1* | 2/2014 | Yamaguchi | G05B 13/042 |
| | | | 700/280 |
| 2015/0101421 A1* | 4/2015 | Takahashi | G01L 3/045 |
| | | | 73/862.325 |
| 2015/0219510 A1 | 8/2015 | Takahashi | |
| 2016/0116367 A1 | 4/2016 | Pfister et al. | |

FOREIGN PATENT DOCUMENTS

| | | |
|---|---|---|
| JP | 2010-019652 A | 1/2010 |
| JP | 2013-246152 A | 12/2013 |
| JP | 2016-520841 A | 7/2016 |

* cited by examiner

DYNAMOMETER SYSTEM CONTROL DEVICE

TECHNICAL FIELD

The present invention relates to a control device of a dynamometer system.

BACKGROUND ART

In dynamometer systems which incorporate rocking type dynamometers such as an engine bench system, a drive train bench system and a chassis dynamometer system, a load cell is used as a sensor for detecting torque related to the control and measurement thereof. The load cell detects torque acting on a rocking piece of the dynamometer through a torque arm which is extended from the rocking piece. Although due to a structure as described above, on the output signal of the load cell, in addition to the torque actually detected with the dynamometer, a torque variation component caused by the natural vibration of the rocking piece is superimposed, this variation component is originally an unnecessary component for the control and measurement of the system.

Hence, in recent years, technologies have been proposed in which the unnecessary torque variation component is removed from the output signal of the load cell (see patent documents 1 and 2). In the control devices of dynamometer systems disclosed in patent documents 1 and 2, a correction signal for suppressing the natural vibration of the rocking piece is generated with a natural vibration suppression control circuit, a high level torque command signal generated with a high level control device is corrected with the correction signal, the resulting signal is input to the dynamometer and thus the vibration of the rocking piece itself is suppressed, with the result that the detection signal of the load cell with a reduced variation component is obtained. The natural vibration suppression control circuits disclosed in patent documents 1 and 2 use a normative model simulating the input/output characteristic of the dynamometer system so as to generate the correction signal for suppressing the natural vibration of the rocking piece.

In the dynamometer systems disclosed in patent documents 1 and 2, the natural vibration suppression control circuit is used to suppress the vibration of the rocking piece itself, and thus it is possible to realize high response and stable control as compared with, for example, a case where the variation component included in the output signal of the load cell is thereafter removed by utilization of a filter technology.

Patent Document 1: Japanese Unexamined Patent Application, Publication No. 2006-184135
Patent Document 2: Japanese Unexamined Patent Application, Publication No. 2013-246152

DISCLOSURE OF THE INVENTION

Problems to be Solved by the Invention

Incidentally, various loads are connected to the output shaft of a dynamometer. More specifically, in a chassis dynamometer system, auxiliary units such as a roller on which a driving wheel of a vehicle serving as a test piece is installed and a plurality of flywheels for realizing set inertia apply to the loads described above. In a drive train bench system, auxiliary units such as an intermediate shaft and a speed increaser provided between the input shaft of a drive train serving as a test piece and the output shaft of a dynamometer apply to the loads described above, and in an engine bench system, auxiliary units such as an intermediate shaft provided between the output shaft of an engine serving as a test piece and the output shaft of a dynamometer apply to the loads described above.

However, when these loads are connected to the dynamometer, a mechanical loss in the dynamometer is increased accordingly. Although these loads are removably provided in the dynamometer, and thus the mechanical loss is changed by how the loads are set by an operator, in the control devices of the dynamometer systems disclosed in patent documents 1 and 2, sufficient consideration is not given to the mechanical loss generated in the dynamometer and a variation in the mechanical loss caused by the provision of the loads described above.

In other words, when the configuration or the like of a load connected to a dynamometer main body is changed, a mechanical loss generated is also changed, and thus an error occurs between an actual device and a normative model specified in a natural vibration suppression control circuit. Hence, the responsiveness of control and the accuracy of measurement of a load cell may be lowered.

An object of the present invention is to provide a control device of a dynamometer system which can perform high response and stable control and can perform a measurement with high accuracy even when the configuration of a load connected to a dynamometer main body is changed.

Means for Solving the Problems (1) A dynamometer system (for example, a dynamometer system 1 which will be described later) includes: a rocking type dynamometer main body (for example, a dynamometer main body 2 which will be described later); a load (for example, rollers 6L and 6R and flywheels 71, 72 and 73 which will be described later) which is connected to the output shaft of the dynamometer main body; an inverter (for example, an inverter 3 which will be described later) which supplies electric power to the dynamometer main body according to a torque current command signal; a torque sensor (for example, a load cell 28 which will be described later) which detects torque generated in a rocking piece (for example, a rocking piece 21 which will be described later) of the dynamometer main body through a torque arm (for example, a torque arm 26 which will be described later) extended from the rocking piece; and an angular velocity sensor (for example, an encoder 29 which will be described later) which detects an angular velocity of the output shaft. The control device (for example, a control device 4 which will be described later) of the dynamometer system includes: a loss computation unit (for example, a mechanical loss computation unit 48 which will be described later) which generates, based on a detection signal (for example, an angular velocity detection signal SPdy_d which will be described later) of the angular velocity sensor, a loss compensation signal (for example, a loss compensation signal ML_ref which will be described later) corresponding to loss torque generated in the dynamometer main body in a state where the load is connected thereto; a natural vibration suppression control circuit (for example, a natural vibration suppression control circuit 43 which will be described later) which generates, with the torque current command signal, a detection signal (for example, a load cell torque detection signal LC_det which will be described later) of the torque sensor and the loss compensation signal, a correction signal for a high level torque command signal so as to suppress a natural vibration of the rocking piece; and a torque current command signal generation unit (for example, a torque current command signal generation unit 49 which will be described later) which inputs, to the inverter, the torque current command signal generated by subtracting the correction signal from the high level torque command signal, and the natural vibration suppression control circuit includes: a normative model computation unit (for example, a normative model computation unit 432 which will be described later) which has an input/output characteristic simulating a characteristic from the torque current command signal to the detection signal of the torque sensor in the dynamometer system; a deviation compensator (for example, a deviation compensator 433 which will be described later) which generates a feedback signal with a deviation (for example, a deviation err which will be described later) between an output torque signal from the normative model computation unit and the detection signal of the torque sensor so as to decrease the deviation; a model input generation unit (for example, a model input generation unit 434 which will be described later) which generates an input torque signal to the normative model computation unit with the feedback signal and a torque signal obtained by subtracting the loss compensation signal from the torque current command signal; and a differential compensator (for example, a differential compensator 437 which will be described later) which generates the correction signal by performing a differential computation on the torque signal (for example, a torque signal Pmdl_det which will be described later) obtained in the normative model computation unit.

(2) Preferably, in this case, the loss computation unit includes a storage medium which stores a lookup table in which a correlation between the value of the detection signal of the angular velocity sensor and the value of the loss compensation signal corresponding to the value is prescribed, and generates the loss compensation signal for a value obtained by searching the lookup table with the value of the detection signal of the angular velocity sensor.

(3) Preferably, in this case, the load includes one or a plurality of auxiliary units connected to the output shaft, in the storage medium, a plurality of the lookup tables are stored which are different from each other so as to respectively correspond to combinations of the dynamometer main body and the auxiliary units connected to the dynamometer main body and the loss computation unit selects one of the lookup tables according to an operation of an operator, and generates the loss compensation signal for a value obtained by searching the selected lookup table with the value of the detection signal of the angular velocity sensor.

(4) Preferably, in this case, the loss computation unit includes a storage medium that stores a computation formula in which the value of the detection signal of the angular velocity sensor is an input and in which the value of the loss compensation signal corresponding to the input is an output, and generates the loss compensation signal for a value obtained by inputting the value of the detection signal of the angular velocity sensor to the computation formula.

(5) Preferably, in this case, the load includes one or a plurality of auxiliary units connected to the output shaft, in the storage medium, a plurality of the computation formulas are stored which are different from each other so as to respectively correspond to combinations of the dynamometer main body and the auxiliary units connected to the dynamometer main body and the loss computation unit selects one of the computation formulas according to an operation of the operator, and generates the loss compensation signal for a value obtained by inputting the value of the detection signal of the angular velocity sensor to the selected computation formula.

Effects of the Invention (1) In the present invention, the correction signal generated in the natural vibration suppression control circuit is subtracted from the high level torque command signal so as to generate the torque current command signal, and this signal is input to the inverter of the dynamometer main body to which the load is connected. In the dynamometer main body including the rocking piece, the transfer function from the input to the inverter to the output of the torque sensor is approximately expressed by a secondary delay standard form. Hence, in the natural vibration suppression control circuit of the present invention, the differential compensator performs the differential compensation on the torque signal obtained in the normative model computation unit having the input/output characteristic simulating the characteristic from the torque current command signal to the detection signal of the torque sensor in the dynamometer system so as to generate the correction signal, and the correction signal is subtracted from the high level torque command signal so as to generate the torque current command signal. In the present invention, the correction signal as described above is used, and thus it is possible to provide damping to the dynamometer main body so as to suppress the natural vibration of the rocking piece. In the control device of the present invention, the natural vibration suppression control circuit which includes the differential compensator as described above is provided, and thus the natural vibration of the rocking piece itself is suppressed, with the result that it is possible to remove an unnecessary torque variation component from the detection signal of the torque sensor. Hence, in the present invention, it is possible to obtain the stable detection signal from the torque sensor without use of a filtering technology of a low cut-off (interrupting) frequency. With the natural vibration suppression control circuit as described above, the natural vibration of the rocking piece is suppressed, and thus it is possible to realize high response and stable control.

When the configuration of the load connected to the dynamometer main body is changed, the mechanical loss generated is changed, with the result that an error may occur between an actual device and the normative model specified in the natural vibration suppression control circuit. Hence, in the loss computation unit of the present invention, based on the detection signal of the angular velocity sensor, the loss compensation signal corresponding to the loss torque generated in the dynamometer main body in a state where the load is connected thereto is generated, and in the natural vibration suppression control circuit, the torque current command signal, the detection signal of the torque sensor and the loss compensation signal are used so as to generate the correction signal. More specifically, in the natural vibration suppression control circuit, the torque signal obtained by subtracting the loss compensation signal from the torque current command signal and the feedback signal calculated in the deviation compensator are used so as to generate the input torque signal of the normative model computation unit, and the torque signal obtained when the input torque signal as described above is input to the normative model computation unit is used so as to generate the correction signal. In this way, even when the configuration of the loads connected to the dynamometer main body is changed, and thus the mechanical loss is changed such that an error occurs between the actual device and the normative model specified in the natural vibration suppression control circuit, this error is compensated for by the loss compensation signal. Hence, in the control device of the present invention, even when the mechanical loss is changed, it is possible to perform high response and stable control and to perform a measurement with high accuracy.

(2) In the loss computation unit of the present invention, the preset lookup table is searched with the value of the detection signal of the angular velocity sensor, and thus the loss compensation signal is generated. In this way, it is possible to rapidly generate the loss compensation signal corresponding to the detection signal of the angular velocity sensor.

(3) When the combination of the dynamometer main body and the auxiliary units connected to the output shaft of the dynamometer main body as the load is changed, the magnitude of the mechanical loss generated in the dynamometer main body is also changed. Hence, in the present invention, a plurality of lookup tables which are different from each other so as to respectively correspond to the combinations of the dynamometer main body and the auxiliary units connected to the dynamometer main body are stored in the storage medium, one of the lookup tables is selected according to the operation of the operator and furthermore, the selected lookup table is searched with the value of the detection signal of the angular velocity sensor so as to generate the loss compensation signal. In this way, even when the combination of the auxiliary units connected to the dynamometer main body is changed, the loss compensation signal whose magnitude is appropriately adjusted according to the variation can easily be generated.

(4) In the loss computation unit of the present invention, the value of the detection signal of the angular velocity sensor is input to the preset computation formula, and thus the loss compensation signal is generated. In this way, it is possible to rapidly generate the loss compensation signal corresponding to the detection signal of the angular velocity sensor.

(5) In the present invention, a plurality of computation formulas which are different from each other so as to respectively correspond to the combinations of the dynamometer main body and the auxiliary units connected to the output shaft of the dynamometer main body as the load are stored in the storage medium, one of the computation formulas is selected according to the operation of the operator and furthermore, the value of the detection signal of the angular velocity sensor is input to the selected computation formula so as to generate the loss compensation signal. In this way, even when the combination of the auxiliary units connected to the dynamometer main body is changed, the loss compensation signal whose magnitude is appropriately adjusted according to the variation can easily be generated.

PREFERRED MODE FOR CARRYING OUT THE INVENTION

Figure 1:
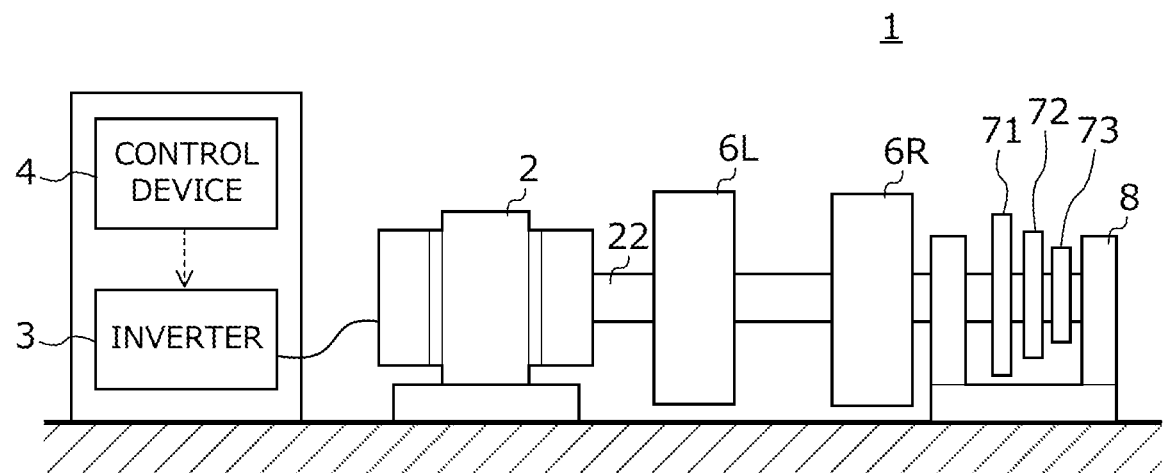
FIG. 1 is a diagram showing the configuration of a rocking type dynamometer system according to an embodiment of the present invention.

An embodiment of the present invention will be described below with reference to drawings. FIG. 1 is a diagram showing the configuration of a dynamometer system 1 according to the present embodiment. The dynamometer system 1 is a so-called mechanical inertia type chassis dynamometer system that includes: a rocking type dynamometer main body 2; rollers 6L and 6R and a plurality of flywheels 71, 72 and 73 which are provided as load in the output shaft 22 of the dynamometer main body 2; a support stand 8 which supports the rollers 6L and 6R and the flywheels 71 to 73 such that they can be rotated coaxially with the output shaft 22; an inverter 3 which supplies electric power to the dynamometer main body 2; and a control device 4 which controls the dynamometer main body 2.

On the rollers 6L and 6R, both left and right wheels of a vehicle (not shown) which are test targets are placed. The flywheels 71 to 73 have different masses and are provided removably with respect to the output shaft 22. When the dynamometer system 1 is used to perform tests for the exhaust, the fuel consumption and the like of the test vehicle, the flywheels 71 to 73 are combined as necessary so as to be provided in the output shaft 22, and thus an equivalent inertia mass corresponding to the weight of the test vehicle is set.

Figure 2:
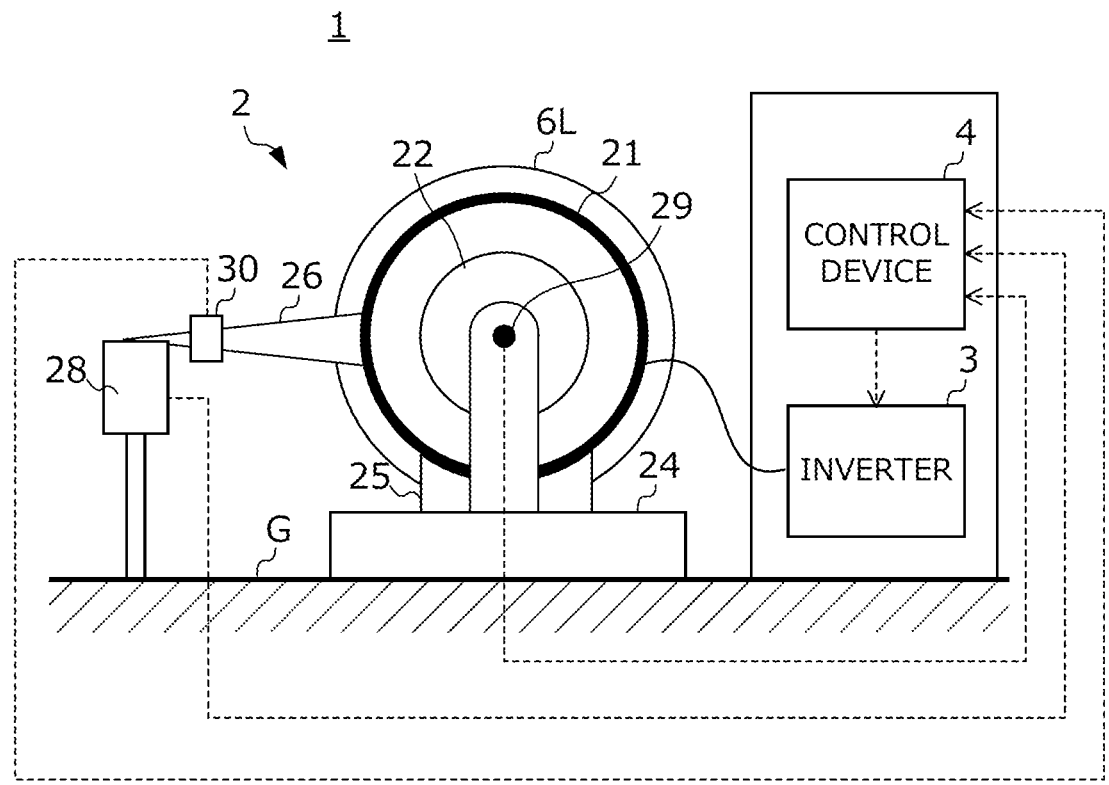
FIG. 2 is a diagram when the dynamometer system is seen along the axial direction of the dynamometer.

FIG. 2 is a diagram when the dynamometer main body 2 is seen along an axial direction. The dynamometer main body 2 includes: a cylindrical rocking piece 21; the output shaft 22 which is rotatably supported within the rocking piece 21; a pedestal 25 which rockingly supports the rocking piece 21 along a circumferential direction on a base 24 fixed to an installation surface G; a load cell 28 which detects torque generated in the rocking piece 23; and an encoder 29 which detects the number of revolutions of a rotor 22.

On a side portion of the rocking piece 21, a torque arm 26 is provided which is extended outward along a radial direction. The load cell 28 is provided between a tip end portion of the torque arm 26 and the installation surface G. The load cell 28 transmits, to the control device 4, a detection signal (hereinafter also referred to as the "load cell torque detection signal") corresponding to a load (the output torque of the dynamometer main body 2) acting between the torque arm 26 and the installation surface G.

In the tip end portion of the torque arm 26, an acceleration sensor 30 is provided which detects the acceleration of the torque arm 26. The acceleration sensor 30 transmits, to the control device 4, a detection signal corresponding to the acceleration of the torque arm 26 along the direction of the load of the load cell 28. The encoder 29 transmits, to the control device 4, a pulse signal (hereinafter also referred to as the "angular velocity detection signal") corresponding to the angular velocity of the output shaft 22.

The control device 4 generates, based on the detection signals of the load cell 28, the encoder 29, the acceleration sensor 30 and the like, a torque current command signal for the dynamometer main body 2, and inputs it to the inverter 3. The inverter 3 supplies the electric power corresponding to the torque current command signal to the dynamometer main body 2.

The configuration of the control device 4 of the rocking type dynamometer system 1 as described above will be described below.

Figure 3:
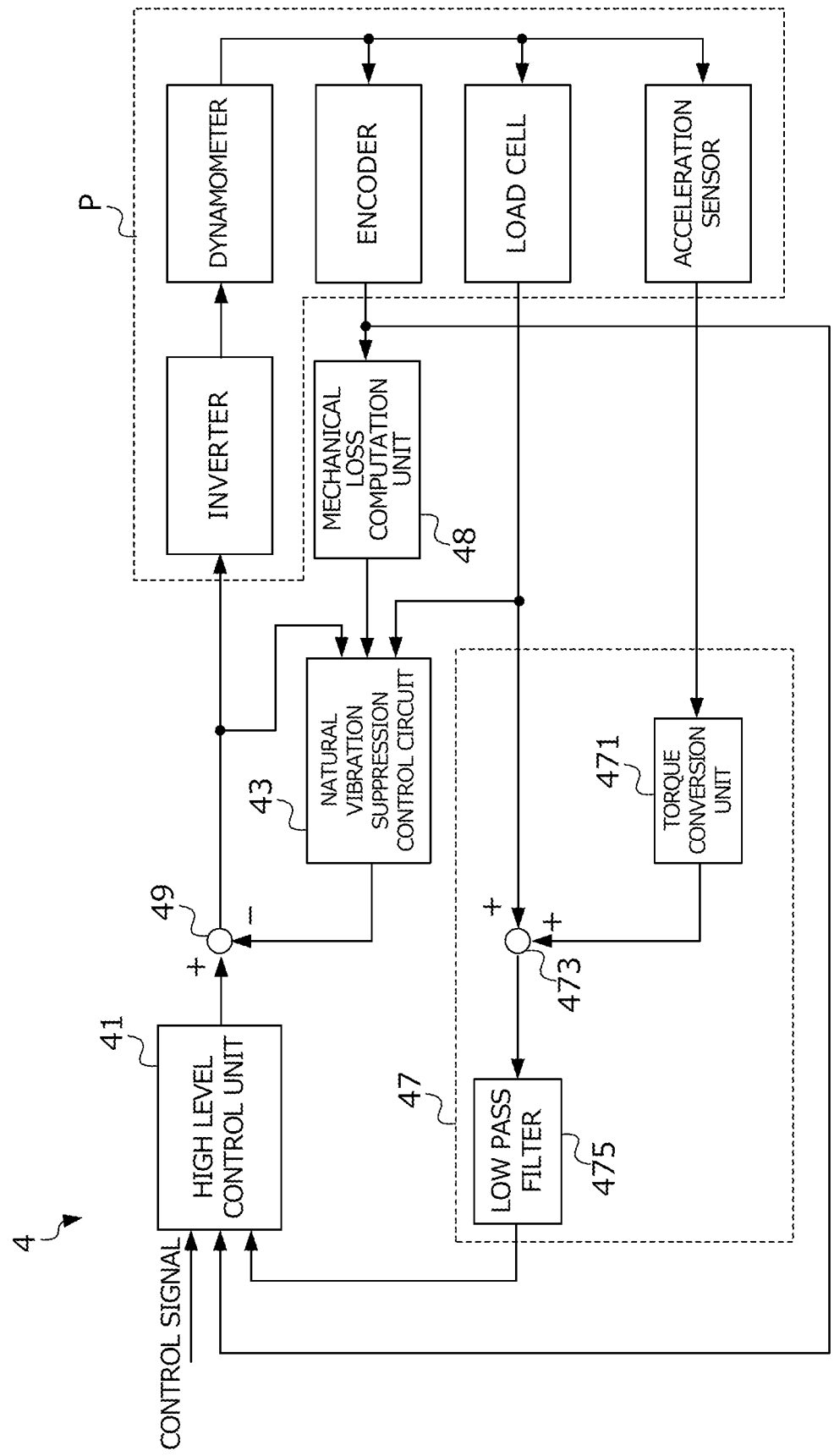
FIG. 3 is a block diagram showing the configuration of a control device of the dynamometer system.

FIG. 3 is a block diagram showing the configuration of the control device 4. In FIG. 3, a control target P includes the inverter, the dynamometer main body, the load cell and the acceleration sensor and the like which are described with reference to FIGS. 1 and 2. The control device 4 includes: a high level control unit 41 which generates a high level torque command signal for the torque current command signal; a natural vibration suppression control circuit 43 which generates a correction signal for correcting the high level torque command signal output from the high level control unit 41; a correction circuit 47 which corrects the load cell torque detection signal of the load cell; a mechanical loss computation unit 48 which generates, based on the angular velocity detection signal of the encoder, a loss compensation signal corresponding to mechanical loss torque generated in the dynamometer main body; and a torque current command signal generation unit 49.

The high level control unit 41 uses a control command that is determined by unillustrated processing, the load cell torque detection signal which is passed through the correction circuit 47 to be described later such that torque pulsation, noise and the like are removed and the angular velocity detection signal, and thereby generates the high level torque command signal. The torque current command signal generation unit 49 subtracts the correction signal generated in the natural vibration suppression control circuit 43 which will be described later from the high level torque command signal generated in the high level control unit 41, thereby generates the torque current command signal and inputs it to the inverter.

The correction circuit 47 includes a torque conversion unit 471, an adder unit 473 and a low pass filter 475. The torque conversion unit 471 removes, from the detection signal of the acceleration sensor, a direct-current component whose frequency is equal to or less than a predetermined frequency, then reverses its phase by 180 degrees, further multiplies the resulting signal by a predetermined coefficient and thereby generates a torque signal. The adder unit 473 adds, to the load cell torque detection signal, the torque signal generated in the torque conversion unit 471 so as to remove a torque pulsation component from the load cell torque detection signal. The low pass filter 475 removes harmonic noise from the torque signal generated in the adder unit 473, and thereby inputs, to the high level control unit 41, the load cell torque detection signal in which the torque pulsation, the noise and the like are removed.

The mechanical loss computation unit 48 estimates, based on the angular velocity detection signal, the mechanical loss torque generated in the dynamometer main body in a state where the rollers and the flywheels serving as auxiliary units in the dynamometer system 1 are connected thereto, and outputs it as the loss compensation signal.

Figure 4:
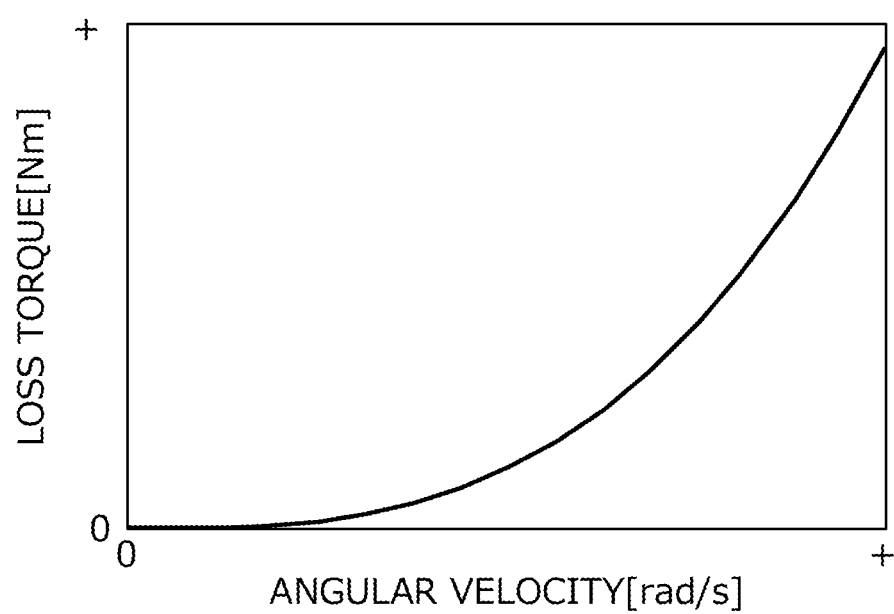
FIG. 4 is a diagram showing an example of the computation result of a mechanical loss computation unit in the control device.

FIG. 4 is a diagram showing an example of the computation result of the mechanical loss computation unit 48. In FIG. 4, a horizontal axis represents an angular velocity [rad/s] corresponding to the input of the mechanical loss computation unit 48, and a vertical axis represents mechanical loss torque [Nm] corresponding to the output of the mechanical loss computation unit 48. As shown in FIG. 4, in the mechanical loss computation unit 48, as the value of the angular velocity is increased, the value of the mechanical loss torque is increased.

The natural vibration suppression control circuit 43 generates the correction signal for the high level torque command signal based on the torque current command signal to the inverter, the load cell torque detection signal which is not passed through the correction circuit 47 which will be described later and the loss compensation signal which is generated in the mechanical loss computation unit 48 so as to suppress the natural vibration of the a rocking piece.

Figure 5:
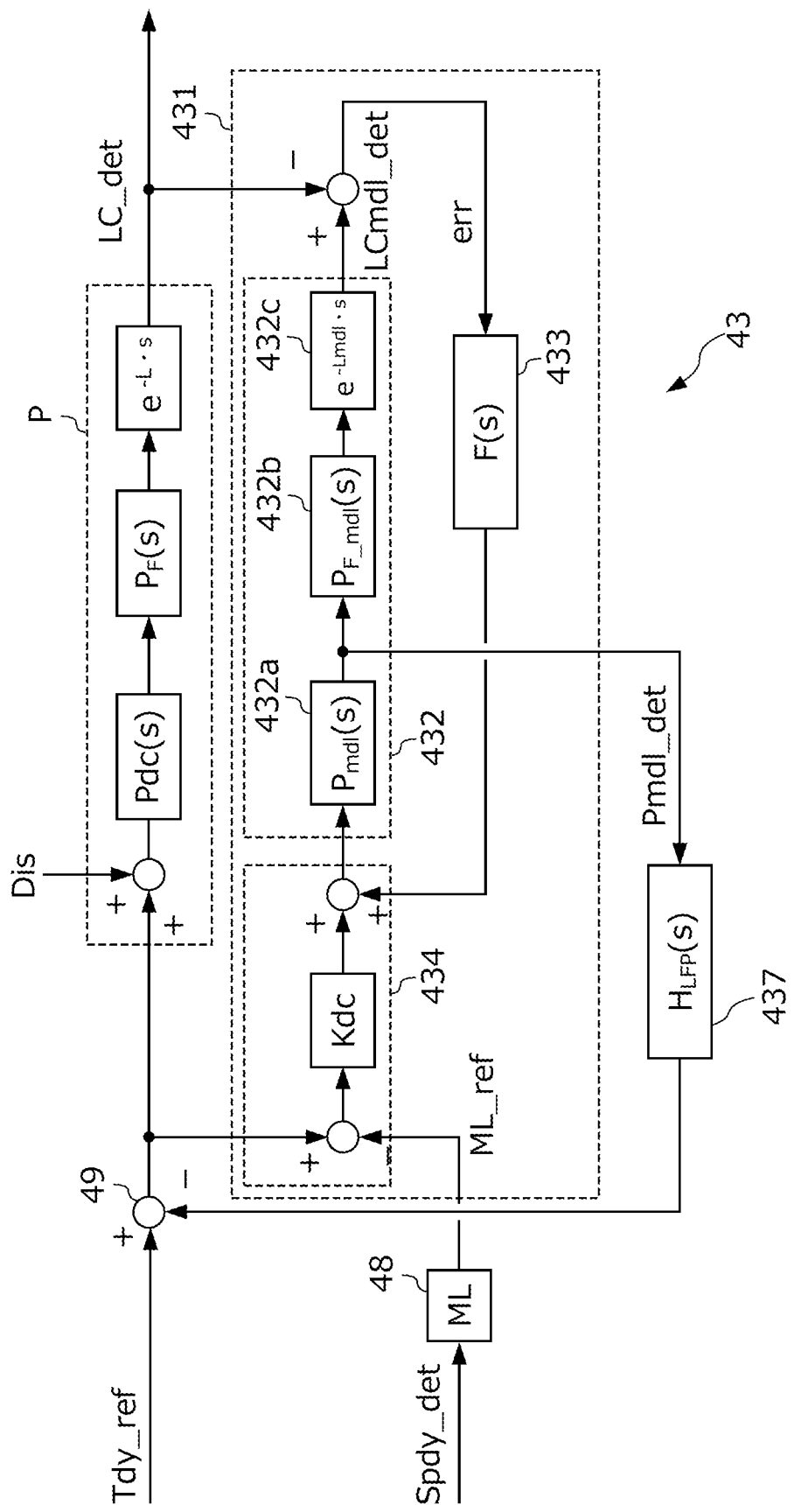
FIG. 5 is a block diagram showing the configuration of a natural vibration suppression control circuit in the control device.

FIG. 5 is a block diagram showing the configuration of the natural vibration suppression control circuit 43. In FIG. 4, the high level torque command signal is represented by "Tdy_ref", the load cell torque detection signal is represented by "LC_det", disturbance torque is represented by "Dis", the angular velocity detection signal is represented by "SPdy_det" and the loss compensation signal is represented by "ML_ref".

The control target P is formed by combining a transfer function "Pdc(s)" indicating a direct-current gain characteristic and a vibration characteristic between the input to the inverter and the output of the load cell, a transfer function "$P_F(s)$" indicting a detection characteristic (low pass filter characteristic) and a transfer function "$e^{-L \cdot S}(s)$" indicating a detection waste time characteristic.

The natural vibration suppression control circuit 43 includes: a model compensation circuit 431 which performs a computation with consideration given to the direct-current gain characteristic, the vibration characteristic, the detection characteristic, the detection waste time characteristic included in the control target P and a mechanical loss characteristic; and a differential compensator 437 which performs a differential computation on the torque signal Pmdl_det obtained in the model compensation circuit 431 so as to generate the correction signal.

As the transfer function "$H_{LPF}(s)$" of the differential compensator 437, for example, a transfer function is used which has a pseudo differential characteristic as represented in formula (1) below. In formula (1) below, "ωn" represents the natural vibration frequency of the rocking piece. A transfer function "$1/G_{LPF}(s)$" is an arbitrary function in which a relative degree is equal to or greater than 1. A coefficient "K" is an arbitrary real number, and the specific value thereof is set within a range of 0 to 1 such that the natural vibration of the rocking piece is suppressed. The reason why the correction signal generated with the differential compensator 437 as described above is used to correct the high level torque command signal such that the natural vibration of the rocking piece is suppressed is disclosed in Japanese Unexamined Patent Application, Publication No. 2013-246152 by the applicant of the present application, and thus details thereof will be omitted here.

$$H_{LPF}(s) = \frac{2 \cdot K \cdot s}{\omega n} \cdot \frac{1}{G_{LPF}(s)} \tag{1}$$

The model compensation circuit 431 includes: a normative model computation unit 432 which has an input/output characteristic simulating a characteristic from the torque current command signal serving as the input of the control target P to the load cell torque detection signal serving as the output thereof; a deviation compensator 433 which uses a deviation err between an output torque signal LCmdl_det from the normative model computation unit 432 and the load cell torque detection signal LC_det so as to generate a feedback signal for decreasing the deviation err; and a model input generation unit 434 which uses the torque current command signal input to the control target P, the feedback signal from the deviation compensator 433 and the loss compensation signal ML_ref from the mechanical loss computation unit 48 so as to generate an input torque signal to the normative model computation unit 432.

The model input generation unit 434 multiplies, by a predetermined gain Kdc, a torque signal obtained by subtracting the loss compensation signal ML_ref from the mechanical loss computation unit 48 from the torque current command signal input to the control target P. The gain Kdc is a constant for compensating for the direct-current gain characteristic of the control target P. The model input generation unit 434 sums the torque signal obtained by multiplying the gain Kdc and the feedback signal from the deviation compensator 433 so as to generate the input torque signal to the normative model computation unit 432.

The normative model computation unit 432 combines and uses: a vibration characteristic compensation computation unit 432a which performs a computation simulating the vibration characteristic in the control target P; a detection characteristic compensation computation unit 432b which performs a computation simulating the detection characteristic; and a waste time characteristic compensation computation unit 432c which performs a computation simulating the detection waste time characteristic, and thereby performs a computation simulating the characteristic from the torque current command signal to the load cell torque detection signal in the control target P.

The vibration characteristic compensation computation unit 432a inputs, to the detection characteristic compensation computation unit 432b and the differential compensator 437, the torque signal Pmdl_det obtained by inputting the input torque signal from the model input generation unit 434 to a transfer function $P_{mdl}(s)$ simulating the vibration characteristic of the control target P. Here, as the transfer function $P_{mld}(s)$ in the vibration characteristic compensation computation unit 432a, a transfer function is used which is represented by a secondary delay standard form as represented in formula (2) below using the natural vibration frequency ωn of the rocking piece and a damping coefficient ζ.

$$P_{mdl}(s) = \frac{\omega n^2}{s^2 + 2 \cdot \varsigma \cdot \omega n \cdot s + \omega n^2} \quad (2)$$

The detection characteristic compensation computation unit 432b inputs, to the waste time characteristic compensation computation unit 432c, a torque signal obtained by inputting the torque signal Pmdl_det from the vibration characteristic compensation computation unit 432a to a transfer function $P_{F\_mdl}(s)$ simulating the detection characteristic of the control target P. Here, as the transfer function $P_{F\_mdl}(s)$ in the detection characteristic compensation computation unit 432b, a transfer function is used which has the low pass filter characteristic.

The waste time characteristic compensation computation unit 432c outputs, as the output torque signal LCmdl_det, a signal obtained by inputting the torque signal from the detection characteristic compensation computation unit 432b to a transfer function $e^{-Lmdl \cdot s}$ simulating the detection waste time characteristic of the control target P. Here, "Lmdl" represents a waste time, and a predetermined value is used.

The deviation compensator 433 outputs the feedback signal such that a deviation err obtained by subtracting the load cell torque detection signal LC_det from the output torque signal LCmdl_det from the normative model computation unit 432 is decreased. The transfer function "F(s)" of the deviation compensator 433 is represented by, for example, formula (3) below. In formula (3) below, a coefficient "KG" is an adjustment gain, and the specific value thereof is set within a range of 0 to 1. In formula (3) below, a transfer function "$1/F_{LPF}(s)$" is an arbitrary transfer function in which a relative degree is equal to or greater than 1.

$$F(s) = KG \cdot \frac{1}{F_{LPF}(s)} \quad (3)$$

In the control device 4 of the dynamometer system 1 as described above and according to the present embodiment, the following effects are achieved.

(1) In the control device 4, the correction signal generated in the natural vibration suppression control circuit 43 is subtracted from the high level torque command signal Tdy_ref, thus the torque current command signal is generated and this signal is input to the inverter 3 of the dynamometer main body 2 to which the loads such as the rollers 6L and 6R and the flywheels 71 to 73 are connected. In the dynamometer main body 2 including the rocking piece 21, the transfer function from the input to the inverter 3 to the output of the load cell 28 is approximately expressed by a secondary delay standard form. Hence, in the natural vibration suppression control circuit 43, the differential compensator 437 performs the differential compensation on the torque signal Pmdl_det obtained in the normative model computation unit 432 having the input/output characteristic simulating the characteristic from the torque current command signal to the load cell torque detection signal LC_det in the dynamometer system 1 so as to generate the correction signal, and the correction signal is subtracted from the high level torque command signal so as to generate the torque current command signal. In the control device 4, the correction signal as described above is used, and thus it is possible to provide damping to the dynamometer main body 2 so as to suppress the natural vibration of the rocking piece 21. In the control device 4, the natural vibration suppression control circuit 43 which includes the differential compensator 437 as described above is provided, and thus the natural vibration of the rocking piece itself is suppressed, with the result that it is possible to remove an unnecessary torque variation component from the load cell torque detection signal LC_det. Hence, in the control device 4, it is possible to obtain the stable detection signal from the load cell 28 without use of a filtering technology of a low cut-off frequency. With the natural vibration suppression control circuit 43 as described above, the natural vibration of the rocking piece is suppressed, and thus it is possible to realize high response and stable control.

When the configuration of the auxiliary units connected as the load to the dynamometer main body 2 (for example, the combination of the flywheels) is changed, the mechanical loss generated is changed, with the result that an error may occur between an actual device and the normative model specified in the normative model computation unit 432. Hence, in the mechanical loss computation unit 48 of the control device 4, based on the angular velocity detection signal SPdy_det, the loss compensation signal ML_ref corresponding to the mechanical loss torque generated in the dynamometer main body 2 in a state where the auxiliary units are connected thereto is generated, and in the natural vibration suppression control circuit 43, the torque current command signal, the load cell torque detection signal LC_det and the loss compensation signal ML_ref are used so as to generate the correction signal. More specifically, in the natural vibration suppression control circuit 43, the torque signal obtained by subtracting the loss compensation signal ML_ref from the torque current command signal and the feedback signal calculated in the deviation compensator 433 are used so as to generate the input torque signal of the normative model computation unit 432, and the torque signal Pmdl_det obtained when the input torque signal as described above is input to the normative model computation unit 432 is used so as to generate the correction signal. In this way, even when the configuration of the auxiliary units connected to the dynamometer main body 2 is changed, and thus the mechanical loss torque is changed such that an error occurs between the actual device and the normative model specified in the normative model computation unit 432, this error is compensated for by the loss compensation signal ML_ref. Hence, in the control device 4, even when the load connected to the dynamometer main body 2 is changed, it is possible to perform high response and stable control and to perform a measurement with high accuracy.

Figure 6:
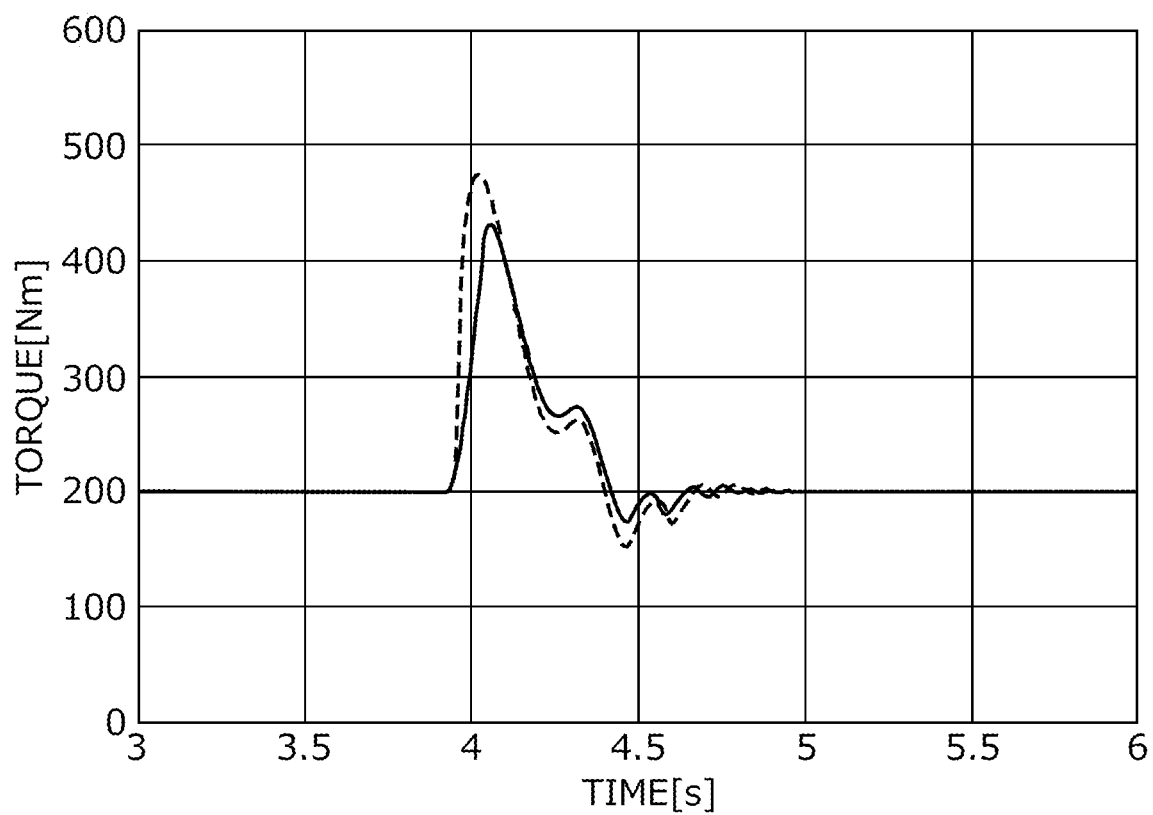
FIG. 6 is a diagram showing the result of a test which was performed for verifying the effect of the control device.

FIG. 6 is a diagram showing the result of a test which was performed for verifying the effect of the control device 4 of the present embodiment. In this test, a variation in load cell torque detection signal when disturbance torque was superimposed at the time of 3.9 seconds in a steady state where the value of the high level torque command signal was set to 200 [Nm] was measured. A broken line in FIG. 6 indicates a variation in the load cell torque detection signal when the loss compensation signal ML_ref calculated in the mechanical loss computation unit 48 was not input to the natural vibration suppression control circuit 43, and a solid line indicates a variation in the load cell torque detection signal when the loss compensation signal ML_ref was input to the natural vibration suppression control circuit 43. As shown in FIG. 6, the loss compensation signal ML_ref is input, and thus it is possible to decrease the amplitude of the load cell torque detection signal. Hence, in the control device 4 of the present embodiment, it is possible to realize high response and stable torque control.

Example 1

The mechanical loss computation unit of example 1 will then be described. The mechanical loss computation unit of example 1 includes a storage medium which stores a lookup table in which a correlation between the value of the angular velocity detection signal and the value of the loss compensation signal corresponding to this value is prescribed, and generates the loss compensation signal ML_ref for a value obtained by searching the lookup table with the value of the angular velocity detection signal SPdy_det.

As described previously, a plurality of flywheels 71 to 73 form a plurality of auxiliary units in the dynamometer system 1, and they can be combined as necessary so as to be connected to the dynamometer main body 2. Hence, in the storage medium, a plurality of lookup tables are stored which are different from each other so as to respectively correspond to the combinations of the dynamometer main body 2 and the auxiliary units connected to the dynamometer main body 2 (in the present example, the combinations of the flywheels). At the time of utilization of the control device, the operator can select one of the lookup tables according to the actual combination of the flywheels connected to the dynamometer main body 2, and the mechanical loss computation unit generates the loss compensation signal ML_ref for a value obtained by searching, with the value of the angular velocity detection signal SPdy_det, the lookup table selected by the operation of the operator.

In the control device using the mechanical loss computation unit of example 1, the following effects are achieved.

(2) In the mechanical loss computation unit of the present example, the preset lookup table is searched with the value of the angular velocity detection signal SPdy_det, and thus the loss compensation signal ML_ref is generated. In this way, it is possible to rapidly generate the loss compensation signal ML_ref.

(3) When the combination of the auxiliary units connected to the dynamometer main body 2 is changed, the magnitude of the mechanical loss generated in the dynamometer main body is also changed. In the mechanical loss computation unit of the present example, the lookup tables which are different from each other so as to respectively correspond to the combinations of the auxiliary units are stored in the storage medium, and thus even when the combination of the auxiliary units connected to the dynamometer main body is changed, the loss compensation signal ML_ref whose magnitude is appropriately adjusted according to the variation can easily be generated.

Example 2

The mechanical loss computation unit of example 2 will then be described. The mechanical loss computation unit of example 2 includes a storage medium which stores a computation formula in which the value of the angular velocity detection signal is an input and in which the value of the loss compensation signal corresponding to the input is an output, and generates the loss compensation signal ML_ref for a value obtained by inputting the value of the angular velocity detection signal SPdy_det to the computation formula.

Here, as the computation formula, for example, a secondary equation of the angular velocity detection signal SPdy_det as represented in formula (4) below is used. In formula (4) below, "A", "B" and "C" are coefficients which are determined by an estimation method such as a least-square method or a known optimization method.

$$ML\_ref = A + B \cdot SPdy\_det + C \cdot SPdy\_det^2 \qquad (4)$$

As with the mechanical loss computation unit of example 1, in the storage medium, a plurality of computation formulas are stored which are different from each other so as to respectively correspond to the combinations of the auxiliary units connected to the dynamometer main body 2 (in the present example, the combinations of the flywheels). At the time of utilization of the control device, the operator can select one of the computation formulas according to the actual combination of the auxiliary units connected to the dynamometer main body 2, and the mechanical loss computation unit generates the loss compensation signal ML_ref for a value obtained by inputting the value of the angular velocity detection signal SPdy_det to the computation formula selected by the operation of the operator.

In the control device using the mechanical loss computation unit of example 2, the following effects are achieved.

(4) In the mechanical loss computation unit of the present example, the value of the angular velocity detection signal SPdy_det is input to the preset computation formula, and thus the loss compensation signal ML_ref is generated. In this way, it is possible to rapidly generate the loss compensation signal ML_ref.

(5) In the mechanical loss computation unit of the present example, the computation formulas which are different from each other so as to respectively correspond to the combinations of the auxiliary units connected to the dynamometer main body 2 are stored in the storage medium, and thus even when the combination of the auxiliary units connected to the dynamometer main body is changed, the loss compensation signal ML_ref whose magnitude is appropriately adjusted according to the variation can easily be generated.

Although the embodiment of the present invention is described above, the present invention is not limited to this embodiment. Detailed configuration may be changed as necessary without departing from the spirit of the present invention. For example, although in the embodiment described above, the case where the control device of the present invention is applied to the chassis dynamometer system in which the vehicle is the test piece is described, the present invention is not limited to this case. The control device of the present invention can also be applied to an engine bench system in which the engine of a vehicle is the test piece and a drive train bench system in which the drive train of a vehicle is the test piece.

In the engine bench system, an intermediate shaft is used as an auxiliary unit between the output shaft of the dynamometer main body and the output shaft of the engine. Hence, when the control device of the present invention is applied to the engine bench system, in the storage medium of the mechanical loss computation unit, lookup tables or computation formulas are stored which are different from each other so as to respectively correspond to the combinations of the dynamometer main body and the auxiliary units connected to the dynamometer main body, and thus even in the engine bench system, the same effects as (1) to (5) described above are achieved.

In the drive train bench system, an intermediate shaft, a speed increaser and the like are used as auxiliary units between the output shaft of the dynamometer main body and the input shaft of a drive train. Hence, when the control device of the present invention is applied to the drive train bench system, in the storage medium of the mechanical loss computation unit, lookup tables or computation formulas are stored which are different from each other so as to respectively correspond to the combinations of the dynamometer main body and the auxiliary units connected to the dynamometer main body, and thus even in the drive train bench system, the same effects as (1) to (5) described above are achieved.

EXPLANATION OF REFERENCE NUMERALS 1 dynamometer system
2 dynamometer main body
21 rocking piece
26 torque arm
28 load cell
29 encoder (angular velocity sensor)
3 inverter
4 control device
43 natural vibration suppression control circuit
432 normative model computation unit
433 deviation compensator
434 model input generation unit
437 differential compensator
49 torque current command signal generation unit
6L, 6R roller (load)
71, 72, 73 flywheel (load)

The invention claimed is:
1. A dynamometer system comprising:
a dynamometer main body;
a load which is connected to an output shaft of the dynamometer main body;
an inverter which supplies electric power to the dynamometer main body according to a torque current command signal;
a torque sensor which detects torque generated in a rocking piece of the dynamometer main body through a torque arm extended from the rocking piece;
an angular velocity sensor which detects an angular velocity of the output shaft; and
a control device which generates the torque current command signal based on detection signals of the torque sensor and the angular velocity sensor;
wherein the control device includes:
a loss computation unit which generates, based on a detection signal of the angular velocity sensor, a loss compensation signal corresponding to loss torque generated in the dynamometer main body in a state where the load is connected thereto;
a natural vibration suppression control circuit which generates, with the torque current command signal, the detection signal of the torque sensor and the loss compensation signal, a correction signal for a high level torque command signal so as to suppress a natural vibration of the rocking piece; and
a torque current command signal generation unit which inputs, to the inverter, the torque current command signal generated by subtracting the correction signal from the high level torque command signal,
wherein the natural vibration suppression control circuit includes:
a normative model computation unit which has an input/output characteristic simulating a characteristic from the torque current command signal to the detection signal of the torque sensor in the dynamometer system;
a deviation compensator which generates a feedback signal with a deviation between an output torque signal from the normative model computation unit and the detection signal of the torque sensor so as to decrease the deviation;
a model input generation unit which generates an input torque signal to the normative model computation unit with the feedback signal and a torque signal obtained by subtracting the loss compensation signal from the torque current command signal; and
a differential compensator which generates the correction signal by performing a differential computation on the torque signal obtained in the normative model computation unit.

2. The dynamometer system according to claim 1, wherein the loss computation unit includes a storage medium which stores a lookup table in which a correlation between a value of the detection signal of the angular velocity sensor and a value of the loss compensation signal corresponding to the value is prescribed, and generates the loss compensation signal for a value obtained by searching the lookup table with the value of the detection signal of the angular velocity sensor.

3. The dynamometer system according to claim 2, wherein the load includes one or a plurality of auxiliary units connected to the output shaft,
in the storage medium, a plurality of the lookup tables are stored which are different from each other so as to respectively correspond to combinations of the dynamometer main body and the auxiliary units connected to the dynamometer main body and the loss computation unit selects one of the lookup tables according to an operation of an operator, and generates the loss compensation signal for a value obtained by searching the selected lookup table with the value of the detection signal of the angular velocity sensor.

4. The dynamometer system according to claim 1, wherein the loss computation unit includes a storage medium that stores a computation formula in which a value of the detection signal of the angular velocity sensor is an input and in which a value of the loss compensation signal corresponding to the input is an output, and generates the loss compensation signal for a value obtained by inputting the value of the detection signal of the angular velocity sensor to the computation formula.

5. The dynamometer system according to claim 4, wherein the load includes one or a plurality of auxiliary units connected to the output shaft, in the storage medium, a plurality of the computation formulas are stored which are different from each other so as to respectively correspond to combinations of the dynamometer main body and the auxiliary units connected to the dynamometer main body and the loss computation unit selects one of the computation formulas according to an operation of an operator, and generates the loss compensation signal for a value obtained by inputting the value of the detection signal of the angular velocity sensor to the selected computation formula.

* * * * *